United States Patent
Ra et al.

(10) Patent No.: US 8,160,071 B2
(45) Date of Patent: Apr. 17, 2012

(54) APPARATUS AND METHOD FOR PROCESSING L2/L3 PACKET

(75) Inventors: Yong Wook Ra, Daejeon (KR); Chang Ho Choi, Daejeon (KR); Tae Kyu Kang, Daejeon (KR); Byung Jun Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 322 days.

(21) Appl. No.: 12/628,734

(22) Filed: Dec. 1, 2009

(65) Prior Publication Data

US 2010/0135302 A1 Jun. 3, 2010

(30) Foreign Application Priority Data

Dec. 2, 2008 (KR) .................. 10-2008-0121250
Jun. 9, 2009 (KR) .................. 10-2009-0050960

(51) Int. Cl.
*H04L 12/28* (2006.01)
*H04J 3/16* (2006.01)
(52) U.S. Cl. ...................... 370/392; 370/466
(58) Field of Classification Search .................. None
See application file for complete search history.

(56) References Cited

U.S. PATENT DOCUMENTS

| | | | |
|---|---|---|---|
| 7,697,528 B2 * | 4/2010 | Parry et al. ............. | 370/392 |
| 2002/0027906 A1 * | 3/2002 | Athreya et al. .......... | 370/386 |
| 2005/0138206 A1 | 6/2005 | Moreels et al. | |
| 2006/0126624 A1 * | 6/2006 | Yazaki et al. ........... | 370/389 |
| 2007/0183419 A1 | 8/2007 | Kompella | |
| 2007/0183425 A1 * | 8/2007 | Lim et al. ............... | 370/392 |
| 2009/0025077 A1 * | 1/2009 | Trojanowski ............ | 726/11 |

FOREIGN PATENT DOCUMENTS

| | | |
|---|---|---|
| KR | 2008-0021491 A | 3/2008 |
| KR | 2008-0052026 A | 6/2008 |
| WO | WO-2007-038853 A1 | 4/2007 |

OTHER PUBLICATIONS

IEEE 802.1ad-2005 Amendment to IEEE 802.1Q-2005. IEEE Standard for Local and Metropolitan Area Networks—Virtual Bridged Local Area Networks—Revision—Amendment 4: Provider Bridges.
IEEE 802.1ah-2008 IEEE Standard for Local and Metropolitan Area Networks—Virtual Bridged Local Area Networks Amendment 6: Provider Backbone Bridges.

* cited by examiner

*Primary Examiner* — Hassan Phillips
*Assistant Examiner* — Hicham Foud
(74) *Attorney, Agent, or Firm* — Rabin & Berdo, P.C.

(57) ABSTRACT

An L2/L3 packet processing and method are disclosed to process various Ethernet packets by interworking with a PBBN (Provider Backbone Bridges Network), a PBN (Provider Bridges Network), and an IPN (Internet Protocol Network).

14 Claims, 18 Drawing Sheets

| L2 Header Length Definition ||||||
|---|---|---|---|---|---|---|
| LLC | B-Flag | I-Flag | S-Flag | C-Flag | AHL | Valid |
| 0 | 0 | 0 | 0 | 0 | AHL = 8'd14 | Valid |
| 0 | 0 | 0 | 0 | 1 | AHL = 8'd18 | Valid |
| 0 | 0 | 0 | 1 | 0 | AHL = 8'd18 | Invalid |
| 0 | 0 | 0 | 1 | 1 | AHL = 8'd22 | Valid |
| 0 | 0 | 0 | 1 | 1 | AHL = 8'd22 | Valid |
| 0 | 0 | 1 | 0 | 0 | AHL = 8'd34 | Invalid |
| 0 | 0 | 1 | 0 | 1 | AHL = 8'd38 | Valid |
| 0 | 0 | 1 | 1 | 0 | AHL = 8'd38 | Invalid |
| 0 | 0 | 1 | 1 | 1 | AHL = 8'd42 | Valid |
| 0 | 1 | 0 | 0 | 0 | AHL = 8'd18 | Invalid |
| 0 | 1 | 0 | 0 | 1 | AHL = 8'd22 | Invalid |
| 0 | 1 | 0 | 1 | 0 | AHL = 8'd22 | Invalid |
| 0 | 1 | 0 | 1 | 1 | AHL = 8'd26 | Invalid |
| 0 | 1 | 1 | 0 | 0 | AHL = 8'd36 | Invalid |
| 0 | 1 | 1 | 0 | 1 | AHL = 8'd40 | Valid |
| 0 | 1 | 1 | 1 | 0 | AHL = 8'd40 | Invalid |
| 0 | 1 | 1 | 1 | 1 | AHL = 8'd44 | Valid |
| 1 | 0 | 0 | 0 | 0 | AHL = SNAP ? 8'd22 : 8'd17 | Valid |
| 1 | 0 | 0 | 0 | 1 | AHL = SNAP ? 8'd26 : 8'd21 | Valid |
| 1 | 0 | 0 | 1 | 0 | AHL = SNAP ? 8'd26 : 8'd21 | Invalid |
| 1 | 0 | 0 | 1 | 1 | AHL = SNAP ? 8'd30 : 8'd25 | Invalid |
| 1 | 0 | 1 | 0 | 0 | AHL = SNAP ? 8'd42 : 8'd37 | Invalid |
| 1 | 0 | 1 | 0 | 1 | AHL = SNAP ? 8'd46 : 8'd41 | Invalid |
| 1 | 0 | 1 | 1 | 0 | AHL = SNAP ? 8'd46 : 8'd41 | Invalid |
| 1 | 0 | 1 | 1 | 1 | AHL = SNAP ? 8'd50 : 8'd45 | Invalid |
| 1 | 1 | 0 | 0 | 0 | AHL = SNAP ? 8'd26 : 8'd21 | Invalid |
| 1 | 1 | 0 | 0 | 1 | AHL = SNAP ? 8'd30 : 8'd25 | Invalid |
| 1 | 1 | 0 | 1 | 0 | AHL = SNAP ? 8'd30 : 8'd25 | Invalid |
| 1 | 1 | 0 | 1 | 1 | AHL = SNAP ? 8'd34 : 8'd29 | Invalid |
| 1 | 1 | 1 | 0 | 0 | AHL = SNAP ? 8'd44 : 8'd39 | Invalid |
| 1 | 1 | 1 | 0 | 1 | AHL = SNAP ? 8'd48 : 8'd43 | Invalid |
| 1 | 1 | 1 | 1 | 0 | AHL = SNAP ? 8'd48 : 8'd43 | Invalid |
| 1 | 1 | 1 | 1 | 1 | AHL = SNAP ? 8'd52 : 8'd47 | Invalid |

FIG. 4

IPv6/Ethernet/B-tag From 802.1ah(PBB -> PB)

| BYTE LANE | 7 [63:56] | 6 [55:48] | 5 [47:40] | 4 [39:32] | 3 [31:24] | 2 [23:16] | 1 [15:8] | 0 [7:0] | Clock Cycle |
|---|---|---|---|---|---|---|---|---|---|
| | SFD | 0x55 | 0x55 | 0x55 | 0x55 | 0x55 | 0x55 | 0xD5 | 0 |
| | B_DA_0 | B_DA_1 | B_DA_2 | B_DA_3 | B_DA_4 | B_DA_5 | B_SA_0 | B_SA_1 | 1 |
| | B_SA_2 | B_SA_3 | B_SA_4 | B_SA_5 | TPID_0 | TPID_1 | B_VID_0 | B_VID_1 | 2 |
| | TPID_2 | TPID_3 | I_SID_0 | I_SID_1 | I_SID_2 | I_SID_3 | C_DA_0 | C_DA_1 | 3 |
| | C_DA_2 | C_DA_3 | C_DA_4 | C_DA_5 | C_SA_0 | C_SA_1 | C_SA_2 | C_SA_3 | 4 |
| | C_SA_4 | C_SA_5 | TPID_4 | TPID_5 | S_VID_0 | S_VID_1 | TPID_6 | TPID_7 | 5 |
| | C_VID_0 | C_VID_1 | TPID_8 | TPID_9 | V/TC_0 | TC_1:FL_0 | FL_1 | FL_2 | 6 |
| | LEN_0 | LEN_1 | NHDR | HLIM | SA6_0 | SA6_1 | SA6_2 | SA6_3 | 7 |
| | SA6_4 | SA6_5 | SA6_6 | SA6_7 | SA6_8 | SA6_9 | SA6_10 | SA6_11 | 8 |
| | SA6_12 | SA6_13 | SA6_14 | SA6_15 | DA6_0 | DA6_1 | DA6_2 | DA6_3 | 9 |
| | DA6_4 | DA6_5 | DA6_6 | DA6_7 | DA6_8 | DA6_9 | DA6_10 | DA6_11 | 10 |
| | DA6_12 | DA6_13 | DA6_14 | DA6_15 | | | | | 11 |

FIG. 6A

BYTE LANE

| 7<br>[63:56] | 6<br>[55:48] | 5<br>[47:40] | 4<br>[39:32] | 3<br>[31:24] | 2<br>[23:16] | 1<br>[15:8] | 0<br>[7:0] | Clock<br>Cycle |
|---|---|---|---|---|---|---|---|---|
| Transitional Header | | | | Delivery Header_1 | | | | 0 |
| B_DA_0 | B_DA_1 | B_DA_2 | B_DA_3 | B_DA_4 | B_DA_5 | B_SA_0 | B_SA_1 | 1 |
| B_SA_2 | B_SA_3 | B_SA_4 | B_SA_5 | TPID_0 | TPID_1 | B_VID_0 | B_VID_1 | 2 |
| TPID_2 | TPID_3 | I_SID_0 | I_SID_1 | I_SID_2 | I_SID_3 | C_DA_0 | C_DA_1 | 3 |
| C_DA_2 | C_DA_3 | C_DA_4 | C_DA_5 | C_SA_0 | C_SA_1 | C_SA_2 | C_SA_3 | 4 |
| C_SA_4 | C_SA_5 | TPID_4 | TPID_5 | S_VID_0 | S_VID_1 | TPID_6 | TPID_7 | 5 |
| C_VID_0 | C_VID_1 | TPID_8 | TPID_9 | V/TC_0 | TC_1/FL_0 | FL_1 | FL_2 | 6 |
| LEN_0 | LEN_1 | NHDR | HLIM | SA6_0 | SA6_1 | SA6_2 | SA6_3 | 7 |
| SA6_4 | SA6_5 | SA6_6 | SA6_7 | SA6_8 | SA6_9 | SA6_10 | SA6_11 | 8 |
| SA6_12 | SA6_13 | SA6_14 | SA6_15 | DA6_0 | DA6_1 | DA6_2 | DA6_3 | 9 |
| DA6_4 | DA6_5 | DA6_6 | DA6_7 | DA6_8 | DA6_9 | DA6_10 | DA6_11 | 10 |
| DA6_12 | DA6_13 | DA6_14 | DA6_15 | | | | | 11 |

FIG. 6B

| BYTE LANE | 7 [63:56] | 6 [55:48] | 5 [47:40] | 4 [39:32] | 3 [31:24] | 2 [23:16] | 1 [15:8] | 0 [7:0] | Clock Cycle |
|---|---|---|---|---|---|---|---|---|---|
| | Transitional Header | | | | Delivery Header_1 | | | | 0 |
| | Delivery Header_2 | | | | B_DA_4 | B_DA_5 | B_SA_0 | B_SA_1 | 1 |
| | B_SA_2 | B_SA_3 | B_SA_4 | B_SA_5 | TPID_0 | TPID_1 | B_VID_0 | B_VID_1 | 2 |
| | TPID_2 | TPID_3 | I_SID_0 | I_SID_1 | I_SID_2 | I_SID_3 | C_DA_0 | C_DA_1 | 3 |
| | C_DA_2 | C_DA_3 | C_DA_4 | C_DA_5 | C_SA_0 | C_SA_1 | C_SA_2 | C_SA_3 | 4 |
| | C_SA_4 | C_SA_5 | TPID_4 | TPID_5 | S_VID_0 | S_VID_1 | TPID_6 | TPID_7 | 5 |
| | C_VID_0 | C_VID_1 | TPID_8 | TPID_9 | V/TC_0 | TC_1/FL_0 | FL_1 | FL_2 | 6 |
| | LEN_0 | LEN_1 | NHDR | HLIM | SA6_0 | SA6_1 | SA6_2 | SA6_3 | 7 |
| | SA6_4 | SA6_5 | SA6_6 | SA6_7 | SA6_8 | SA6_9 | SA6_10 | SA6_11 | 8 |
| | SA6_12 | SA6_13 | SA6_14 | SA6_15 | DA6_0 | DA6_1 | DA6_2 | DA6_3 | 9 |
| | DA6_4 | DA6_5 | DA6_6 | DA6_7 | DA6_8 | DA6_9 | DA6_10 | DA6_11 | 10 |
| | DA6_12 | DA6_13 | DA6_14 | DA6_15 | | | | | 11 |

FIG. 6C

| BYTE LANE | 7 [63:56] | 6 [55:48] | 5 [47:40] | 4 [39:32] | 3 [31:24] | 2 [23:16] | 1 [15:8] | 0 [7:0] | Clock Cycle |
|---|---|---|---|---|---|---|---|---|---|
| | Transitional Header | | | | Delivery Header_1 | | | | 0 |
| | Delivery Header_2 | | | | I_SID_0 | I_SID_1 | I_SID_2 | I_SID_3 | 1 |
| | | | | | | | | | 2 |
| | | | | | | | C_DA_0 | C_DA_1 | 3 |
| | C_DA_2 | C_DA_3 | C_DA_4 | C_DA_5 | C_SA_0 | C_SA_1 | C_SA_2 | C_SA_3 | 4 |
| | C_SA_4 | C_SA_5 | TPID_4 | TPID_5 | S_VID_0 | S_VID_1 | TPID_6 | TPID_7 | 5 |
| | C_VID_0 | C_VID_1 | TPID_8 | TPID_9 | V/TC_0 | TC_1/FL_0 | FL_1 | FL_2 | 6 |
| | LEN_0 | LEN_1 | NHDR | HLIM | SA6_0 | SA6_1 | SA6_2 | SA6_3 | 7 |
| | SA6_4 | SA6_5 | SA6_6 | SA6_7 | SA6_8 | SA6_9 | SA6_10 | SA6_11 | 8 |
| | SA6_12 | SA6_13 | SA6_14 | SA6_15 | DA6_0 | DA6_1 | DA6_2 | DA6_3 | 9 |
| | DA6_4 | DA6_5 | DA6_6 | DA6_7 | DA6_8 | DA6_9 | DA6_10 | DA6_11 | 10 |
| | DA6_12 | DA6_13 | DA6_14 | DA6_15 | | | | | 11 |

FIG. 6D

| BYTE LANE | 7 [63:56] | 6 [55:48] | 5 [47:40] | 4 [39:32] | 3 [31:24] | 2 [23:16] | 1 [15:8] | 0 [7:0] | Clock Cycle |
|---|---|---|---|---|---|---|---|---|---|
| | Delivery Header_1 | | | | Delivery Header_2 | | | | 0 |
| | I_SID_0 | I_SID_1 | I_SID_2 | I_SID_3 | C_DA_0 | C_DA_1 | C_DA_2 | C_DA_3 | 1 |
| | C_DA_4 | C_DA_5 | C_SA_0 | C_SA_1 | C_SA_2 | C_SA_3 | C_SA_4 | C_SA_5 | 2 |
| | TPID_4 | TPID_5 | S_VID_0 | S_VID_1 | TPID_6 | TPID_7 | C_VID_0 | C_VID_1 | 3 |
| | TPID_8 | TPID_9 | V/TC_0 | TC_1/FL_0 | FL_1 | FL_2 | LEN_0 | LEN_1 | 4 |
| | NHDR | HLIM | SA6_0 | SA6_1 | SA6_2 | SA6_3 | SA6_4 | SA6_5 | 5 |
| | SA6_6 | SA6_7 | SA6_8 | SA6_9 | SA6_10 | SA6_11 | SA6_12 | SA6_13 | 6 |
| | SA6_14 | SA6_15 | DA6_0 | DA6_1 | DA6_2 | DA6_3 | DA6_4 | DA6_5 | 7 |
| | DA6_6 | DA6_7 | DA6_8 | DA6_9 | DA6_10 | DA6_11 | DA6_12 | DA6_13 | 8 |
| | DA6_14 | DA6_15 | | | | | | | 9 |

FIG. 6E

IPv6/Ethernet/S-Tag to 802.1ah(PB -> PBB)

| BYTE LANE | 7 [63:56] | 6 [55:48] | 5 [47:40] | 4 [39:32] | 3 [31:24] | 2 [23:16] | 1 [15:8] | 0 [7:0] | Clock Cycle |
|---|---|---|---|---|---|---|---|---|---|
| | SFD | 0x55 | 0x55 | 0x55 | 0x55 | 0x55 | 0x55 | 0xD5 | 0 |
| | C_DA_0 | C_DA_1 | C_DA_2 | C_DA_3 | C_DA_4 | C_DA_5 | C_SA_0 | C_SA_1 | 1 |
| | C_SA_2 | C_SA_3 | C_SA_4 | C_SA_5 | TPID_4 | TPID_5 | S_VID_0 | S_VID_1 | 2 |
| | TPID_6 | TPID_7 | C_VID_0 | C_VID_1 | TPID_8 | TPID_9 | V/TC_0 | TC_1/F_0 | 3 |
| | FL_1 | FL_2 | LEN_0 | LEN_1 | NHDR | HLIM | SA6_0 | SA6_1 | 4 |
| | SA6_2 | SA6_3 | SA6_4 | SA6_5 | SA6_6 | SA6_7 | SA6_8 | SA6_9 | 5 |
| | SA6_10 | SA6_11 | SA6_12 | SA6_13 | SA6_14 | SA6_15 | DA6_0 | DA6_1 | 6 |
| | DA6_2 | DA6_3 | DA6_4 | DA6_5 | DA6_6 | DA6_7 | DA6_8 | DA6_9 | 7 |
| | DA6_10 | DA6_11 | DA6_12 | DA6_13 | DA6_14 | DA6_15 | | | 8 |

FIG. 7A

| BYTE LANE | 7 [63:56] | 6 [55:48] | 5 [47:40] | 4 [39:32] | 3 [31:24] | 2 [23:16] | 1 [15:8] | 0 [7:0] | Clock Cycle |
|---|---|---|---|---|---|---|---|---|---|
| | Transitional Header | | | | Delivery Header_1 | | | | 0 |
| | C_DA_0 | C_DA_1 | C_DA_2 | C_DA_3 | C_DA_4 | C_DA_5 | C_SA_0 | C_SA_1 | 1 |
| | C_SA_2 | C_SA_3 | C_SA_4 | C_SA_5 | TPID_4 | TPID_5 | S_VID_0 | S_VID_1 | 2 |
| | TPID_6 | TPID_7 | C_VID_0 | C_VID_1 | TPID_8 | TPID_9 | V/TC_0 | TC_1/F_0 | 3 |
| | FL_1 | FL_2 | LEN_0 | LEN_1 | NHDR | HLIM | SA6_0 | SA6_1 | 4 |
| | SA6_2 | SA6_3 | SA6_4 | SA6_5 | SA6_6 | SA6_7 | SA6_8 | SA6_9 | 5 |
| | SA6_10 | SA6_11 | SA6_12 | SA6_13 | SA6_14 | SA6_15 | DA6_0 | DA6_1 | 6 |
| | DA6_2 | DA6_3 | DA6_4 | DA6_5 | DA6_6 | DA6_7 | DA6_8 | DA6_9 | 7 |
| | DA6_10 | DA6_11 | DA6_12 | DA6_13 | DA6_14 | DA6_15 | | | 8 |

FIG. 7B

| BYTE LANE | 7 | 6 | 5 | 4 | 3 | 2 | 1 | 0 | Clock Cycle |
|---|---|---|---|---|---|---|---|---|---|
| | [63:56] | [55:48] | [47:40] | [39:32] | [31:24] | [23:16] | [15:8] | [7:0] | |
| | Transitional Header | | | | Delivery Header_1 | | | | 0 |
| | Delivery Header_2 | | | | | | | | 1 |
| | | | | | | | | | 2 |
| | | | | | | | | | 3 |
| | C_DA_0 | C_DA_1 | C_DA_2 | C_DA_3 | C_DA_4 | C_DA_5 | C_SA_0 | C_SA_1 | 4 |
| | C_SA_2 | C_SA_3 | C_SA_4 | C_SA_5 | TPID_4 | TPID_5 | S_VID_0 | S_VID_1 | 5 |
| | TPID_6 | TPID_7 | C_VID_0 | C_VID_1 | TPID_8 | TPID_9 | V/TC_0 | TC 1/FI 0 | 6 |
| | FL_1 | FL_2 | LEN_0 | LEN_1 | NHDR | HLIM | SA6_0 | SA6_1 | 7 |
| | SA6_2 | SA6_3 | SA6_4 | SA6_5 | SA6_6 | SA6_7 | SA6_8 | SA6_9 | 8 |
| | SA6_10 | SA6_11 | SA6_12 | SA6_13 | SA6_14 | SA6_15 | DA6_0 | DA6_1 | 9 |
| | DA6_2 | DA6_3 | DA6_4 | DA6_5 | DA6_6 | DA6_7 | DA6_8 | DA6_9 | 10 |
| | DA6_10 | DA6_11 | DA6_12 | DA6_13 | DA6_14 | DA6_15 | | | |

FIG. 7C

| BYTE LANE | 7 [63:56] | 6 [55:48] | 5 [47:40] | 4 [39:32] | 3 [31:24] | 2 [23:16] | 1 [15:8] | 0 [7:0] | Clock Cycle |
|---|---|---|---|---|---|---|---|---|---|
| | Transitional Header | | | | Delivery Header_1 | | | | 0 |
| | Delivery Header_2 | | | | | | | | 1 |
| | B_DA_0 | B_DA_1 | B_DA_2 | B_DA_3 | B_DA_4 | B_DA_5 | B_SA_0 | B_SA_1 | 2 |
| | B_SA_2 | B_SA_3 | B_SA_4 | B_SA_5 | TPID_0 | TPID_1 | B_VID_0 | B_VID_1 | 3 |
| | TPID_2 | TPID_3 | I_SID_0 | I_SID_1 | I_SID_2 | I_SID_3 | C_DA_0 | C_DA_1 | 4 |
| | C_DA_2 | C_DA_3 | C_DA_4 | C_DA_5 | C_SA_0 | C_SA_1 | C_SA_2 | C_SA_3 | 5 |
| | C_SA_4 | C_SA_5 | TPID_4 | TPID_5 | S_VID_0 | S_VID_1 | TPID_6 | TPID_7 | 6 |
| | C_VID_0 | C_VID_1 | TPID_8 | TPID_9 | V/TC_0 | TC_1/FL_0 | FL_1 | FL_2 | 7 |
| | LEN_0 | LEN_1 | NHDR | HLIM | SA6_0 | SA6_1 | SA6_2 | SA6_3 | 8 |
| | SA6_4 | SA6_5 | SA6_6 | SA6_7 | SA6_8 | SA6_9 | SA6_10 | SA6_11 | 9 |
| | SA6_12 | SA6_13 | SA6_14 | SA6_15 | DA6_0 | DA6_1 | DA6_2 | DA6_3 | 10 |
| | DA6_4 | DA6_5 | DA6_6 | DA6_7 | DA6_8 | DA6_9 | DA6_10 | DA6_11 | 11 |
| | DA6_12 | DA6_13 | DA6_14 | DA6_15 | | | | | 12 |

FIG. 7D

| BYTE LANE | 7<br>[63:56] | 6<br>[55:48] | 5<br>[47:40] | 4<br>[39:32] | 3<br>[31:24] | 2<br>[23:16] | 1<br>[15:8] | 0<br>[7:0] | Clock Cycle |
|---|---|---|---|---|---|---|---|---|---|
| | Delivery Header_1 | | | | Delivery Header_2 | | | | 0 |
| | B_DA_0 | B_DA_1 | B_DA_2 | B_DA_3 | B_DA_4 | B_DA_5 | B_SA_0 | B_SA_1 | 1 |
| | B_SA_2 | B_SA_3 | B_SA_4 | B_SA_5 | TPID_0 | TPID_1 | B_VID_0 | B_VID_1 | 2 |
| | TPID_2 | TPID_3 | I_SID_0 | I_SID_1 | I_SID_2 | I_SID_3 | C_DA_0 | C_DA_1 | 3 |
| | C_DA_2 | C_DA_3 | C_DA_4 | C_DA_5 | C_SA_0 | C_SA_1 | C_SA_2 | C_SA_3 | 4 |
| | C_SA_4 | C_SA_5 | TPID_4 | TPID_5 | S_VID_0 | S_VID_1 | TPID_6 | TPID_7 | 5 |
| | C_VID_0 | C_VID_1 | TPID_8 | TPID_9 | V/TC_0 | TC_1/FL_0 | FL_1 | FL_2 | 6 |
| | LEN_0 | LEN_1 | NHDR | HLIM | SA6_0 | SA6_1 | SA6_2 | SA6_3 | 7 |
| | SA6_4 | SA6_5 | SA6_6 | SA6_7 | SA6_8 | SA6_9 | SA6_10 | SA6_11 | 8 |
| | SA6_12 | SA6_13 | SA6_14 | SA6_15 | DA6_0 | DA6_1 | DA6_2 | DA6_3 | 9 |
| | DA6_4 | DA6_5 | DA6_6 | DA6_7 | DA6_8 | DA6_9 | DA6_10 | DA6_11 | 10 |
| | DA6_12 | DA6_13 | DA6_14 | DA6_15 | | | | | 11 |
| | | | | | | | | | 12 |
| | | | | | | | | | 13 |

FIG. 7E

IPv6/Ethernet/C-Tag to 802.1ah(Legacy IP -> PBB)

| BYTE LANE | 7 [63:56] | 6 [55:48] | 5 [47:40] | 4 [39:32] | 3 [31:24] | 2 [23:16] | 1 [15:8] | 0 [7:0] | Clock Cycle |
|---|---|---|---|---|---|---|---|---|---|
| | SFD | 0x55 | 0x55 | 0x55 | 0x55 | 0x55 | 0x55 | 0xD5 | 0 |
| | C_DA_0 | C_DA_1 | C_DA_2 | C_DA_3 | C_DA_4 | C_DA_5 | C_SA_0 | C_SA_1 | 1 |
| | C_SA_2 | C_SA_3 | C_SA_4 | C_SA_5 | TPID_6 | TPID_7 | C_VID_0 | C_VID_1 | 2 |
| | TPID_8 | TPID_9 | V/TC_0 | TC 1/FI 0 | FL_1 | FL_2 | LEN_0 | LEN_1 | 3 |
| | NHDR | HLIM | SA6_0 | SA6_1 | SA6_2 | SA6_3 | SA6_4 | SA6_5 | 4 |
| | SA6_6 | SA6_7 | SA6_8 | SA6_9 | SA6_10 | SA6_11 | SA6_12 | SA6_13 | 5 |
| | SA6_14 | SA6_15 | DA6_0 | DA6_1 | DA6_2 | DA6_3 | DA6_4 | DA6_5 | 6 |
| | DA6_6 | DA6_7 | DA6_8 | DA6_9 | DA6_10 | DA6_11 | DA6_12 | DA6_13 | 7 |
| | DA6_14 | DA6_15 | | | | | | | 8 |

FIG. 8A

| BYTE LANE | 7 [63:56] | 6 [55:48] | 5 [47:40] | 4 [39:32] | 3 [31:24] | 2 [23:16] | 1 [15:8] | 0 [7:0] | Clock Cycle |
|---|---|---|---|---|---|---|---|---|---|
| | Transitional Header | | | | Delivery Header_1 | | | | 0 |
| | C_DA_0 | C_DA_1 | C_DA_2 | C_DA_3 | C_DA_4 | C_DA_5 | C_SA_0 | C_SA_1 | 1 |
| | C_SA_2 | C_SA_3 | C_SA_4 | C_SA_5 | TPID_6 | TPID_7 | C_VID_0 | C_VID_1 | 2 |
| | TPID_8 | TPID_9 | V/TC_0 | TC 1/FI 0 | FL_1 | FL_2 | LEN_0 | LEN_1 | 3 |
| | NHDR | HLIM | SA6_0 | SA6_1 | SA6_2 | SA6_3 | SA6_4 | SA6_5 | 4 |
| | SA6_6 | SA6_7 | SA6_8 | SA6_9 | SA6_10 | SA6_11 | SA6_12 | SA6_13 | 5 |
| | SA6_14 | SA6_15 | DA6_0 | DA6_1 | DA6_2 | DA6_3 | DA6_4 | DA6_5 | 6 |
| | DA6_6 | DA6_7 | DA6_8 | DA6_9 | DA6_10 | DA6_11 | DA6_12 | DA6_13 | 7 |
| | DA6_14 | DA6_15 | | | | | | | 8 |

FIG. 8B

| BYTE LANE | 7 [63:56] | 6 [55:48] | 5 [47:40] | 4 [39:32] | 3 [31:24] | 2 [23:16] | 1 [15:8] | 0 [7:0] | Clock Cycle |
|---|---|---|---|---|---|---|---|---|---|
| | Transitional Header | | | | Delivery Header_1 | | | | 0 |
| | Delivery Header_2 | | | | | | | | 1 |
| | | | | | | | | | 2 |
| | | | | | | | | | 3 |
| | | | | | | | | | 4 |
| | C_DA_0 | C_DA_1 | C_DA_2 | C_DA_3 | C_DA_4 | C_DA_5 | C_SA_0 | C_SA_1 | 5 |
| | C_SA_2 | C_SA_3 | C_SA_4 | C_SA_5 | TPID_6 | TPID_7 | C_VID_0 | C_VID_1 | 6 |
| | TPID_8 | TPID_9 | V/TC_0 | TC_1/FL_0 | FL_1 | FL_2 | LEN_0 | LEN_1 | 7 |
| | NHDR | HLIM | SA6_0 | SA6_1 | SA6_2 | SA6_3 | SA6_4 | SA6_5 | 8 |
| | SA6_6 | SA6_7 | SA6_8 | SA6_9 | SA6_10 | SA6_11 | SA6_12 | SA6_13 | 9 |
| | SA6_14 | SA6_15 | DA6_0 | DA6_1 | DA6_2 | DA6_3 | DA6_4 | DA6_5 | 10 |
| | DA6_6 | DA6_7 | DA6_8 | DA6_9 | DA6_10 | DA6_11 | DA6_12 | DA6_13 | |
| | DA6_14 | DA6_15 | | | | | | | |

FIG. 8C

| BYTE LANE | 7<br>[63:56] | 6<br>[55:48] | 5<br>[47:40] | 4<br>[39:32] | 3<br>[31:24] | 2<br>[23:16] | 1<br>[15:8] | 0<br>[7:0] | Clock Cycle |
|---|---|---|---|---|---|---|---|---|---|
| | Transitional Header | | | | Delivery Header_1 | | | | 0 |
| | Delivery Header_2 | | | | | | | | 1 |
| | R | IP | Route ID | | QoS Index | QoS Index | SA Port | | | 2 |
| | B_DA_0 | B_DA_1 | B_DA_2 | B_DA_3 | B_DA_4 | B_DA_5 | B_SA_0 | B_SA_1 | 3 |
| | B_SA_2 | B_SA_3 | B_SA_4 | B_SA_5 | TPID_0 | TPID_1 | B_VID_0 | B_VID_1 | 4 |
| | TPID_2 | TPID_3 | I_SID_0 | I_SID_1 | I_SID_2 | I_SID_3 | C_DA_0 | C_DA_1 | 5 |
| | C_DA_2 | C_DA_3 | C_DA_4 | C_DA_5 | C_SA_0 | C_SA_1 | C_SA_2 | C_SA_3 | 6 |
| | C_SA_4 | C_SA_5 | TPID_4 | TPID_5 | S_VID_0 | S_VID_1 | TPID_6 | TPID_7 | 7 |
| | C_VID_0 | C_VID_1 | TPID_8 | TPID_9 | V/TC_0 | TC_1/FL_0 | FL_1 | FL_2 | 8 |
| | LEN_0 | LEN_1 | NHDR | HLIM | SA6_0 | SA6_1 | SA6_2 | SA6_3 | 9 |
| | SA6_4 | SA6_5 | SA6_6 | SA6_7 | SA6_8 | SA6_9 | SA6_10 | SA6_11 | 10 |
| | SA6_12 | SA6_13 | SA6_14 | SA6_15 | DA6_0 | DA6_1 | DA6_2 | DA6_3 | 11 |
| | DA6_4 | DA6_5 | DA6_6 | DA6_7 | DA6_8 | DA6_9 | DA6_10 | DA6_11 | 12 |
| | DA6_12 | DA6_13 | DA6_14 | DA6_15 | | | | | 13 |

FIG. 8D

| BYTE LANE | 7 [63:56] | 6 [55:48] | 5 [47:40] | 4 [39:32] | 3 [31:24] | 2 [23:16] | 1 [15:8] | 0 [7:0] | Clock Cycle |
|---|---|---|---|---|---|---|---|---|---|
| | Delivery Header_1 | | | | Delivery Header_2 | | | | 0 |
| | R | IP | Route ID | | QoS Index | QoS Index | SA Port | | B_DA_0 | 1 |
| | B_DA_1 | B_DA_2 | B_DA_3 | B_DA_4 | B_DA_5 | B_SA_0 | B_SA_1 | B_SA_2 | 2 |
| | B_SA_3 | B_SA_4 | B_SA_5 | TPID_0 | TPID_1 | B_VID_0 | B_VID_1 | TPID_2 | 3 |
| | TPID_3 | I_SID_0 | I_SID_1 | I_SID_2 | I_SID_3 | C_DA_0 | C_DA_1 | C_DA_2 | 4 |
| | C_DA_3 | C_DA_4 | C_DA_5 | C_SA_0 | C_SA_1 | C_SA_2 | C_SA_3 | C_SA_4 | 5 |
| | C_SA_5 | TPID_4 | TPID_5 | S_VID_0 | S_VID_1 | TPID_6 | TPID_7 | C_VID_0 | 6 |
| | C_VID_1 | TPID_8 | TPID_9 | V/TC_0 | TC 1/FL_0 | FL_1 | FL_2 | LEN_0 | 7 |
| | LEN_1 | NHDR | HLIM | SA6_0 | SA6_1 | SA6_2 | SA6_3 | SA6_4 | 8 |
| | SA6_5 | SA6_6 | SA6_7 | SA6_8 | SA6_9 | SA6_10 | SA6_11 | SA6_12 | 9 |
| | SA6_13 | SA6_14 | SA6_15 | DA6_0 | DA6_1 | DA6_2 | DA6_3 | DA6_4 | 10 |
| | DA6_5 | DA6_6 | DA6_7 | DA6_8 | DA6_9 | DA6_10 | DA6_11 | DA6_12 | 11 |
| | DA6_13 | DA6_14 | DA6_15 | | | | | | 12 |
| | | | | | | | | | 13 |

FIG. 8E

APPARATUS AND METHOD FOR PROCESSING L2/L3 PACKET

CROSS-REFERENCE TO RELATED APPLICATIONS

This application claims the priorities of Korean Patent Application Nos. 10-2008-0121250 filed on Dec. 2, 2008 and 10-2009-0050960 filed on Jun. 9, 2009, in the Korean Intellectual Property Office, the disclosures of which are incorporated herein by reference.

BACKGROUND OF THE INVENTION

1. Field of the Invention

The present invention relates to a packet processing apparatus and method and, more particularly, to an L2/L3 packet processing apparatus and method capable of processing packets by interworking with a provider backbone bridges network (PBBN), a provider bridges network (PBN), and an Internet protocol network (IPN).

2. Description of the Related Art

The explosive increase in data traffic in the wake of the popularization of the Internet and the integration of wireline and wireless Internet limit the accommodation of a high quality services such as IP-TV in existing complicated networks, and in network equipment using network processors that handle the processing of every packet, the network processors perform the functions of supporting diverse multimedia services and applications, causing a performance degradation phenomenon. In addition, as users who want to be provided with a premium service having a guaranteed quality of service (QoS) require a high-priced TDM line, carrier Ethernet providers actively move toward providing the premium service to users at a low cost by securing a transport network up to a metro edge and metro core network. However, with various types of networks mixedly coexisting, the providers provide different types of premium services, resulting in an increase in maintenance and repair costs.

SUMMARY OF THE INVENTION

An aspect of the present invention provides an L2/L3 packet processing apparatus and method capable of processing various Ethernet packets by interworking with a provider backbone bridges network (PBBN), a provider bridges network (PBN), and an Internet protocol network (IPN).

According to an aspect of the present invention, there is provided an L2/L3 packet processing apparatus for processing packets by interworking with a provider backbone bridges network (PBBN), a provider bridges network (PBN), and an Internet protocol network (IPN), the apparatus including: a header preprocessing unit configured to analyze an L2 header of an input packet to create a transport header and update a flag of the transport header; a packet processor unit configured to analyze an L3 header of a packet which has passed through the header preprocessing unit to generate an IP flow; a packet extension unit connected with the packet processor unit and extending a frame in order to map a packet input from the PBN or the IPN to an L2 format of the PBBN; a packet compressor unit configured to realign packets which have passed through the packet extension unit, remove an unnecessary byte, and incorporate packets; and a look-up table connected to the packet processor unit and the packet extension unit and determining an output port according to information about the input packet.

The L2/L3 packet processing apparatus may further include: a packet filter unit configured to provide medium access control (MAC) filtering and L2-related filtering to the packet which has passed through the header processing unit.

The L2/L3 packet processing apparatus may further include: first and second skid buffers respectively connected to an input unit and an output unit of the packet extension unit to store packets for packet extension.

The header preprocessing unit may include: an Ethertype detection unit configured to extract a first Ethertype from an input packet, sequentially set a VID, a B-Flag, an I-Flag, an S-Flag, and a C-Flag in a first delivery header if the Ethertype is 0x5DC or higher, and sequentially detect second to fifth Ethertypes; and a packet processing unit configured to process the packet which has passed through the Ethertype detection unit into an IPv4, IPv6, MPLS and invalid packet.

If the Ethertype is a B-tag, the Ethertype detection unit may extract the VID and the second Ethertype, if an Ethertype following the extracted second Ethertype is an I-Tag, the Ethertype detection unit may extract an I-SID, set the B-Flag and the I-Flag of the first delivery header, and extract the third Ethertype, if an Ethertype following the extracted third Ethertype is an S-Tag, the Ethertype detection unit may set the S-Flag of the first delivery header and extract the fourth Ethertype, and if an Ethertype following the extracted fourth Ethertype is a C-Tag, the Ethertype detection unit may extract the fifth Ethertype and set the C-Flag in the first delivery header.

If the Ethertype is 0x0800, the packet processing unit may process the input packet into an IPv4 packet, if the Ethertype is 0x86DD, the packet processing unit may process the input packet into an IPv6 packet, if the Ethertype is 0x8847, the packet processing unit may process the input packet into an MPLS packet, and in case of other Ethertypes than the Ethertypes of 0x0800, 0x86DD, and 0x8847, the packet processing unit may set an Except Flag of the first delivery header to process the input packet into an invalid packet.

The L2/L3 packet processing apparatus may further include: a logical link control (LLC) header detection unit configured to set an LLC-Flag to calculate a header length, if the Ethertype of the input packet is smaller than 0x5DC.

If the Ethertype is 0x8870, the LLC header detection unit may extract a destination service access point (DSAP), a source service access point (SSAP), and a Control, of the Ethernet standard 802.2, if the DSAP and the SSAP are 0xFE, the LLC header detection unit may process the input packet into an open system interconnect (OSI) packet, if the DSAP and the SSAP are not 0xFE, the LLC header detection unit may check whether or not the Control is 0x03, and if the Control is not 0x03, the LLC header detection unit may set the Except Flag of the first delivery header to process the input packet into an invalid packet, if the Control is 0x03 and the DSAP and SSAP are 0xAA, the LLC header detection unit may set an SNAP Flag of the first delivery header, extract a next Ethertype, and send the extracted Ethertype to the packet processing unit, and if the DSAP and the SSAP are 0x06, the LLC header detection unit may process the input packet into an IPv4 packet, and if the DSAP and the SSAP are not 0x06, the LLC header detection unit may set the Except Flag of the first delivery header to process the input packet into an invalid packet.

The packet processor unit may include: an L2 processing engine configured to acquire an output port and a local ISID transmitted to the PBN with respect to an L2 frame input from the PBBN; an IPv4 processing engine configured to parse an IPv4 header, calculate a header checksum, and perform updating, if the input packet is an IPv4 packet; an MPLS processing engine configured to update a transitional header and a delivery header for an MPLS label, if the input packet is an MPLS packet; and an IPv6 processing engine configured to analyze a header of an IPv6 packet to acquire various look-up results and generate a 20-bit hash value, if the input packet is the IPv6 packet.

The look-up table may include: a first look-up table connected to the packet processor unit and determining a port output to the PBN or the IPN according to information about a packet input from the PBBN; and a second look-up table connected to the packet extension unit and determining a port output to the PBBN according to information about a packet input from the PBN or the IPN.

According to another aspect of the present invention, there is provided an L2/L3 packet processing method for processing packets by interworking with a provider backbone bridges network (PBBN), a provider bridges network (PBN), and an Internet protocol network (IPN), the method including: a header preprocessing step of analyzing an L2 header of an input packet to generate a transport header, and updating a flag of the transport header; a packet processing step of analyzing an L3 header of a packet which has undergone the preprocessing step to generate an IP flow; and determining an output port according to information about the input packet, and processing the IP flow.

BRIEF DESCRIPTION OF THE DRAWINGS

The above and other aspects, features and other advantages of the present invention will be more clearly understood from the following detailed description taken in conjunction with the accompanying drawings, in which:

FIG. 4 shows a table of L2 header lengths representing the analysis results according to flags of a delivery header in the header preprocessing unit of the L2/L3 packet processing apparatus according to an exemplary embodiment of the present invention;

FIGS. 6A to 6E illustrate a packet conversion process in case of transmitting a packet from a PBBN to a PBN by using the L2/L3 packet processing apparatus according to an exemplary embodiment of the present invention;

FIGS. 7A to 7E illustrate a packet conversion process in case of transmitting a packet from the PBN to the PBBN by using the L2/L3 packet processing apparatus according to an exemplary embodiment of the present invention;

FIGS. 8A to 8E illustrate a packet conversion process in case of transmitting a packet from an IPN to the PBBN by using the L2/L3 packet processing apparatus according to an exemplary embodiment of the present invention.

DETAILED DESCRIPTION OF THE PREFERRED EMBODIMENT

Figure 1:
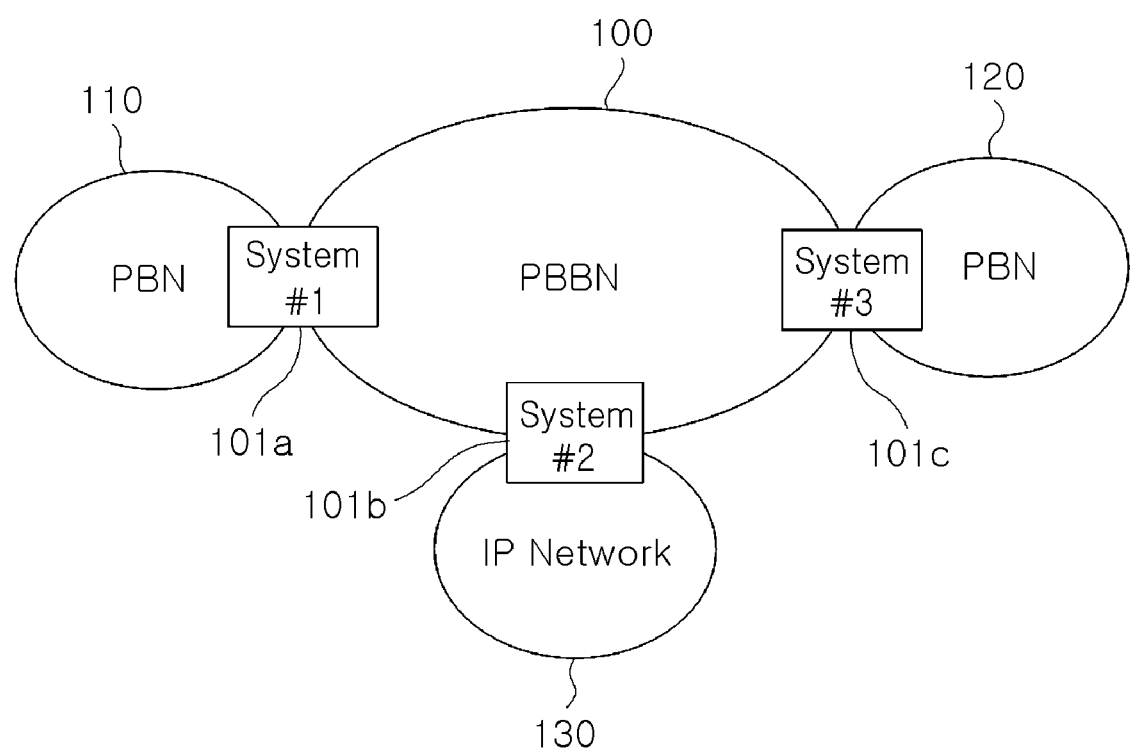
FIG. 1 illustrates the configuration of a packet transport network in which an L2/L3 packet processing apparatus according to an exemplary embodiment of the present invention is used.

Exemplary embodiments of the present invention will now be described in detail with reference to the accompanying drawings. The invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

An L2/L3 packet processing apparatus and method according exemplary embodiments of the present invention will now be described with reference to the accompanying drawings.

FIG. 1 illustrates the configuration of a packet transport network in which an L2/L3 packet processing apparatus according to an exemplary embodiment of the present invention is used.

With reference to FIG. 1, first to third systems 101a, 101b, and 101c may include an L2/L3 packet processing apparatus according to an exemplary embodiment of the present invention, respectively. The first system 101a may transfer a packet between a provider bridges network (PBN) and a provider backbone bridges network (PBBN). The second system 101b may transfer a packet between an Internet protocol network (IPN) and the PBBN. The third system 101c may transfer a packet between the PBBN and the PBN.

Figure 2:
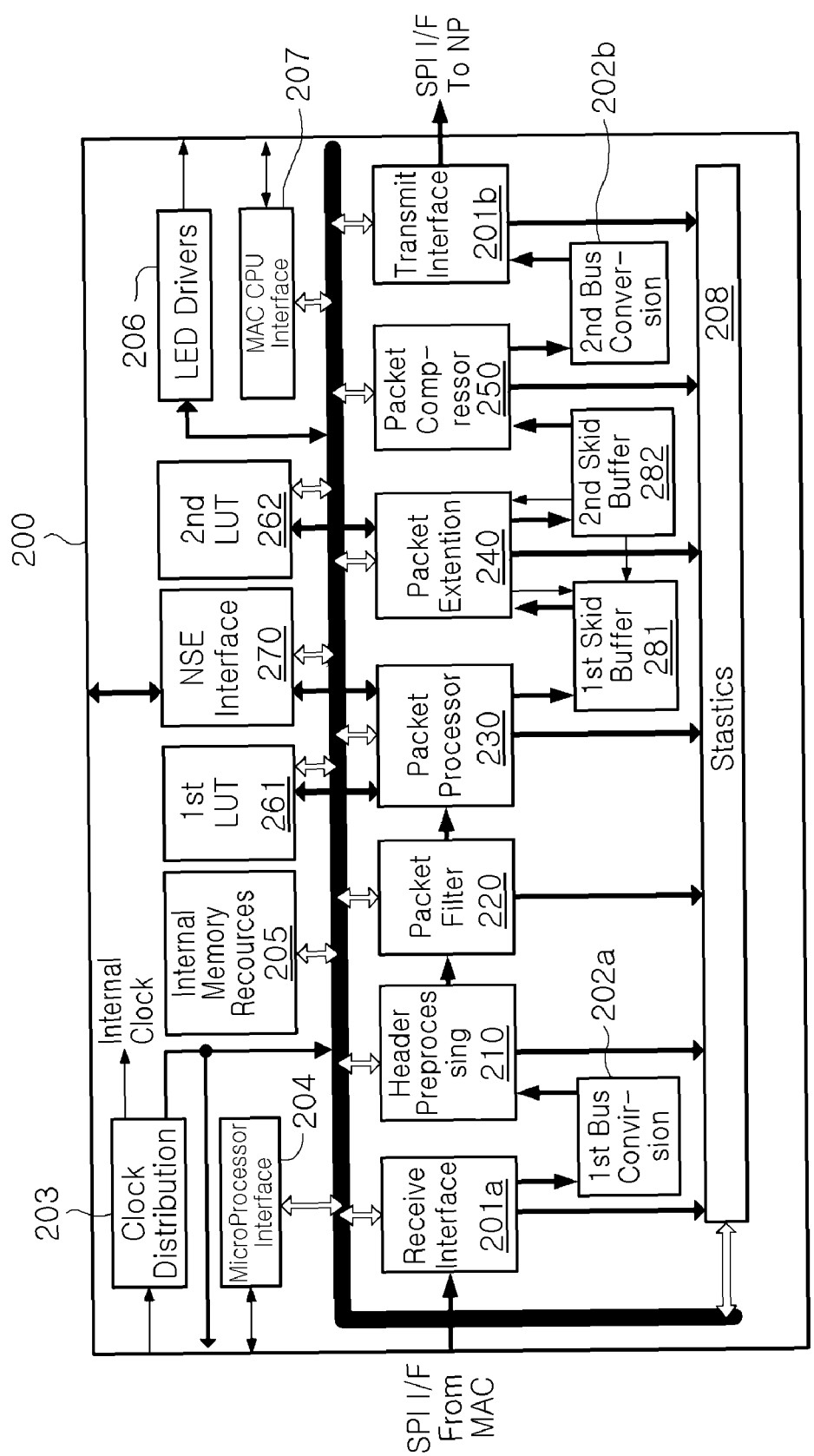
FIG. 2 illustrates the configuration of the L2/L3 packet processing apparatus according to an exemplary embodiment of the present invention.

FIG. 2 illustrates the configuration of the L2/L3 packet processing apparatus according to an exemplary embodiment of the present invention.

With reference to FIG. 2, an L2/L3 packet processing apparatus 200 according to an exemplary embodiment of the present invention, which processes a packet by interworking with the PBBN, the PBN, and the IPN, may include a header preprocessing unit 210, a packet processor unit 230, a packet extension unit 240, a packet compressor unit 250, a first look-up table (LUT) 261 and a second LUT 262.

In the present exemplary embodiment, a receiver interface unit 201a may serve to receive a packet input by way of an SPI interface from a commercial MAC chip outside a 1-gigabit Ethernet or a 10-gigabit Ethernet.

A first bus conversion unit 202a may convert the packet which has been input from the SPI interface into an internal data bus, and generate various data bus control signals.

The header preprocessing unit 210 may analyze an L2 header of the input packet to create a transport header, and update a flag of the transport header. The header preprocessing unit 210 may analyze the L2 header of the input packet to create basic transport headers such as a transitional header, a first delivery header (Delivery Header_1), and a second delivery header (Delivery Header_2), and update the flags of the various transport headers through a preprocessing procedure.

The packet filter unit 220 may perform MAC filtering and various L2-related filtering functions. The packet filter unit 220 may check an Ethernet FCS error of a packet which has passed through the header preprocessing unit 210, and mark it, and may perform filtering on a maximum receive unit (MRU) packet size, Ethernet destination address filtering, and Ethernet source address filtering on a source port, various VLAN IDs (B-Tag, I-Tag, S-Tag, and C-Tag), and an Ethernet source address.

The packet processor unit 230 may analyze an L3 header of a packet which has passed through the packet filter 220 and extract various hash key values to generate an IP flow.

In the present exemplary embodiment, the packet processor unit 230 may include an L2 processing engine, an IPv4 processing engine, an MPLS processing engine, and an IPv6 processing engine. The L2 processing engine may acquire an output port and a local ISID of a packet transmitted to the PBN network with respect to an L2 frame input from the PBBN through an interface with the first LUT unit 261, and process the same.

The IPv4 processing engine may analyze information of a delivery header and an aggregate header length of an input packet, and if the input packet is an IPv4 packet, the IPv4 processing engine may parse the IPv4 header, and calculate a header checksum to perform updating. Also, with respect to a 802.2 logical link control (LLC) packet, the IPv4 processing engine may check a packet length and a total length field of the 802.2 LLC packet, and if they are padded, the IPv4 processing engine may adjust a mask and an end of packet (EOP) to remove the pad. If the input packet is not an IPv4 packet, the IPv4 processing engine may bypass it.

If the input packet is an MPSL packet, the MPLS engine may serve to update a transitional header and a delivery header such as a time-to-live (TTL) copy, an MPLS stack bit, and the like, for an MPLS label. If the input packet is not an MPSL packet, the MPLS processing engine may bypass it.

The IPv6 processing may analyze a header of an IPv6 packet, extract a particular key value, acquire various look-up results such as a route ID, a QoS address (index), a Dos address (index), and the like, through an interface with a network search engine (NSE) interface unit 270, and generate a 20-bit hash value through a hash algorithm.

The interfaces between all the engines of the packet processing unit 230 are the same, and each engine is modularized, so that when only particular engines are required, the required engines may be inserted or removed according to updating of an EvId[1:0] signal of the transitional header.

The first LUT 261 may be connected to the packet processor unit and determine a port output to the PBN or the IPN according to information of the packet input from the PBBN. In the present exemplary embodiment, the first LUT 261 may determine the output port output to the PBNS or the IPN by performing look-up on a B-DA or a B-VID of the packet input from the PBBN extracted through the L2 processing engine of the packet processor unit 230, and transfer the determined output port to the L2 processing engine of the packet processor unit 230.

The NSE interface unit 270, having an interface with an external commercial NSE, may receive a key value extracted from the IPv6 processing engine of the packet processor unit 230 and transmit the received key value to the NSE, and transfer indexes as results obtained after a longest prefix matching (LPM)/quality of service (QoS)/denial of service (DoS) look-up from the NSE, to the IPv6 processing engine.

The packet extension unit 240 may be connected to the packet processor unit 230 and extend a frame to map a packet input from the PBN or the IPN to the L2 format of the PBBN. In the present exemplary embodiment, the packet extension unit 240 may extend the length of the L2 frame in order to encapsulate a B-Tag and an I-Tag with respect to a packet which is input from the PBN and transmitted to the PBBN, and acquire information about the B-Tag through an interface with the second LUT 262.

In the present exemplary embodiment, first and second skid buffers 281 and 282 may be connected with an input terminal and an output terminal of the packet extension unit 240. The first and second skid buffers 281 and 282 may store a packet for a packet extension according to various control signals. The first and second skid buffers 281 and 282 may be configured as synchronous first input first output (FIFO). When the FIFOs, positioning at the input and output terminals of the packet extension unit 240, are filled by a half degree, they generate a stall signal to perform stall control of a data path.

The second LUT 262 may be connected to the packet extension unit 240 and determine a port output to the PBBN according to information about a packet input from the PBN or the IPB. In the present exemplary embodiment, the second LUT 262 may serve to determine a B-DA, a B-SA, a local ISID, and an output port upon checking C-DA and S-VID information of the packet input from the PBN which has been extracted through the packet extension unit 240, and transfer the same to the packet extension unit 240.

The packet compressor unit 250 may realign packets which have passed through the packet extension unit 240, remove an unnecessary byte, and incorporate packets. In the present exemplary embodiment, the packet compressor unit 250 may serve to remove a transitional header of a packet which has been transferred from the packet extension unit 240, remove an unnecessary byte of an input packet, pack empty bytes, and adjust the EOP position of valid data according to removed bytes.

A second bus conversion unit 202b may perform an interface conversion function to output a packet which has been input to a 64-bit internal data bus, to the SPI interface.

A transmit interface unit 201b may serve to transfer an internally processed packet to a network processor or a packet processor through the SPI interface which has been converted by the second bus conversion unit 202b.

An internal memory resource unit 205 may include a read/write register and a dual port RAM (DPRAM) and perform a memory access function through a microprocessor interface unit 204.

A clock distribution unit 203 may generate every clock signal used within the packet processing apparatus and distribute clock signals locked to each block.

The microprocessor interface unit 204 may serve to decode an address input through an interface with an external commercial CPU to generate a chip select, read/write enable, and the like, for a register of each module.

An LED driver 206 may serve to collect information regarding various states such that they can be easily recognized, and transfer them to the exterior.

A MAC CPU interface unit 207 may serve to provide a CPU path for controlling an external commercial MAC chip.

A statistics unit 208 may serve to process various statistics information such as a packet counter, a byte counter, and error counter, and the like.

Figure 3:
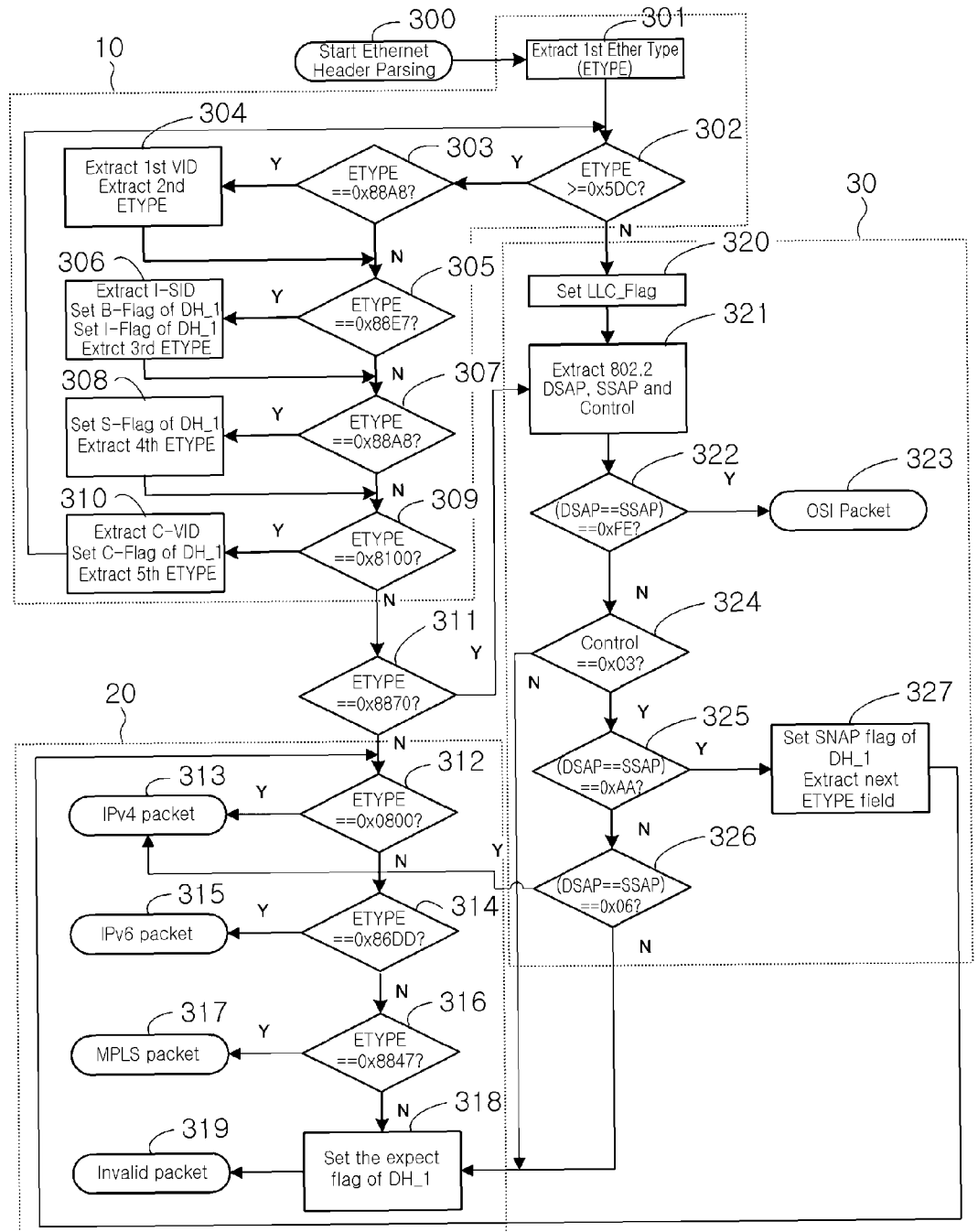
FIG. 3 illustrates the configuration of a header preprocessing unit of the L2/L3 packet processing apparatus according to an exemplary embodiment of the present invention.

FIG. 3 illustrates the configuration of a header preprocessing unit of the L2/L3 packet processing apparatus according to an exemplary embodiment of the present invention.

With reference to FIG. 3, the header preprocessing unit may include an Ethertype detection unit 10, a packet processing unit 20, and a header detection unit 30.

The Ethernet type detection unit 10 may extract a first Ethertype from an input packet. If the Ethertype is 0x5DC or greater, the Ethertype detection unit 10 may sequentially set a VID, a B-Flag, an I-Flag, an S-Flag, and a C-Flag in a first delivery header, and sequentially detect second to fifth Ethertypes.

The operational order of the Ethertype detection unit 10 is as follows. When a packet is input, the Ethertype detection unit 10 may extract a first Ethertype from the input packet (301) and check the Ethertype (302). If the Ethertype is 0x5DC or greater, the Ethertype detection unit 10 may check whether it is a B-tag (303). If the Ethertype is the B-tag, the Ethertype detection unit 10 may extract a B-VID and the second Ethertype (304). If the Ethertype is not the B-Tag, the Ethertype detection unit 10 immediately may check the Ethertype type or check whether an Ethertype type extracted in a next step following the step 304 is I-Tag (305). If the Ethertype is I-Tag, the Ethertype detection unit 10 may extract an I-SID, set the B-Flag and the I-Flag of the first delivery header, and extract the third Ethertype (306). If the Ethertype is not the I-Tag, the Ethertype detection unit 10 may immediately check the Ethertype or may check the third Ethertype extracted in the step 306. If the Ethertype is an S-Tag, the Ethertype may set the S-Flag of the first delivery header and extract the fourth Ethertype (308). If the Ethertype is not the S-Tag, the Ethertype detection unit 10 may immediately check the Ethertype or may check the Ethertype extracted in step 308 (309). If the Ethertype is a C-Tag in step 309, the Ethertype may extract the C-VID and the fifth Ethertype, set the C-Flag of the first delivery header (310), and check the fifth Ethertype extracted in the step 310 (302).

The packet processing unit 20 may process the packet which has passed through the Ethertype detection unit 10 into an IPv4, an IPv6, an MPLS, and invalid packet according to the Ethertype.

If the Ethertype output from the Ethertype detection unit 10 is not the C-Tag, the packet processing unit 20 may immediately check the Ethertype (311). If the checked Ethertype is not the Ethernet standard 802.2 Ethertype, the packet processing unit 20 may check whether the Ethertype is 0x0800 (312). If the Ethertype is 0x0800 in step 312, the packet processing unit 20 may process the packet into an IPv4 packet (313). If the Ethertype is not an IPv4 type, the packet processing unit 20 may check whether the Ethertype is 0x86DD (314). If the Ethertype is 0x86DD, the packet processing unit 20 may process the packet into an IPv6 packet (315). If the Ethertype is not an IPv6 packet in step 314, the packet processing unit may check whether the Ethertype is 0x8847 (316). If the Ethertype is 0x8847, the packet processing unit 20 may process the packet into an MPLS packet (317). If the Ethertype is not 0x8847 in step 316, the packet processing unit 20 may set an Except Flag of the first delivery header (318) and process the packet into an invalid packet (319).

If the Ethertype of the input packet is smaller than 0x5DC, the LLC header detection unit 30 may set an LLC_Flag to calculate a header length.

If the Ethertype of the input packet is smaller than 0x5DC, the LLC header detection unit 30 may set the LLC_Flag (320). If the Ethertype output from the Ethertype detection unit 10 is 0x8870, the LLC header detection unit 30 may extract DSAP (Destination Service Access Point), SSAP (Source Service Access Point) and Control from the Ethernet standard 802.2 (321) and check whether or not the DSAP and SSAP are 0xFE (322). If DSAP and SSAP are 0xFE in step 322, the LLC header detection unit 30 may process the input packet into an open system interconnect (OSI) packet (323). If the DSAP and the SSAP are not 0xFE in step 322, the LLC header detection unit 30 may check whether the Control is 0x03 (324). If the Control is not 0x03 in step 324, the Except Flag of the first delivery header may be set (318) and the input packet may be processed into an invalid packet (319). If the Control is 0x03 in step 324, the LLC header detection unit 30 may check whether or not the DSAP and the SSAP are 0xAA (325). If the DSAP and the SSAP are 0xAA in step 325, the LLC header detection unit 30 may set the SNAP Flag of the first delivery header and extract a next Ethertype (327) to check the Ethertype (312). If the DSAP and the SSAP are not 0xAA in step 325, the LLC header detection unit 30 may check whether or not the DSAP and the SSAP are 0x66 (326).

If the DSAP and the SSAP are 0x66 in step 326, the input packet may be processed into an IPv4 packet (313). If the DSAP and the SSAP are not 0x06 in step 326, the Except Flag of the first delivery header may be set (318) and the input packet may be processed into an invalid packet (319).

FIG. 4 shows a table of L2 header lengths representing the analysis results according to flags of a delivery header in the header preprocessing unit of the L2/L3 packet processing apparatus according to an exemplary embodiment of the present invention. As shown in FIG. 4, aggregate header length (AHL) values of the transitional headers vary depending on the combinations of LLC, B-Flag, I-Flag, S-Flag, and C-Flag values, and a procedure for removing or extending the L2 header may be performed on the headers having a valid AHL.

Figure 5:
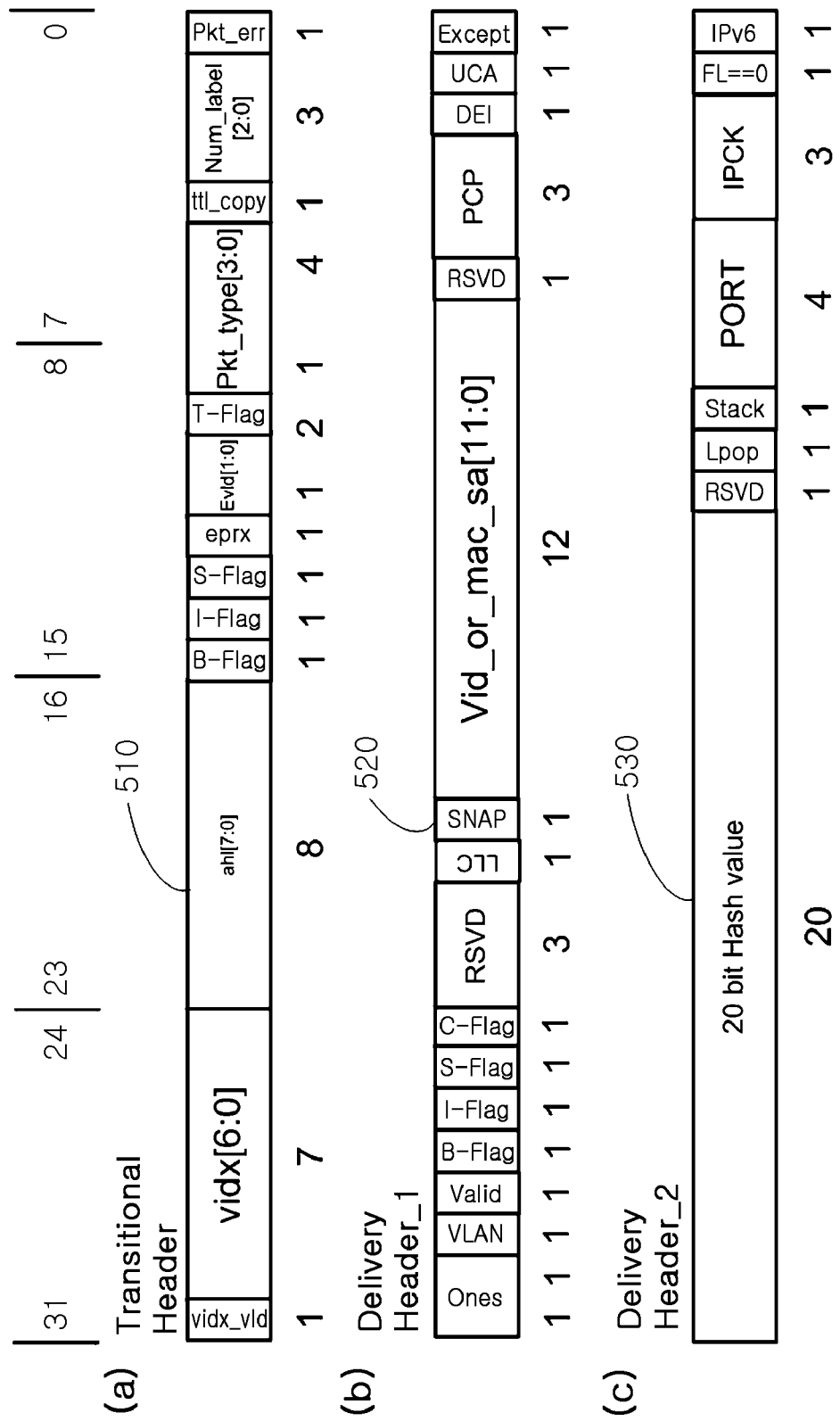
FIGS. 5(a) to 5(c) illustrate transport headers in the L2/L3 packet processing apparatus according to an exemplary embodiment of the present invention.

FIGS. 5(a) to 5(c) illustrate transport headers in the L2/L3 packet processing apparatus according to an exemplary embodiment of the present invention.

As shown in FIG. 5(a), the transitional header may include a signal vidx_vld indicating whether a VLAN index is valid, a vidx[6:0] indicating a valid 7-bit provisioned VLAN index when the vidx_vld signal has a high level, an 8-bit ahl (Aggregate Header Length) [7:0] prepared to facilitate processing of various types of packets by the packet processor unit, a 1-bit B-Flag, a 1-bit I-Flag, a 1-bit S-Flag, a 1-bit eprx, a 2-bit Evld[1:0] indicating whether or not engines included in the packet processor unit are available, a 1-bit T-Flag indicating whether or not it is transparent, a 4-bit pkt_type[3:0] indicating a type of an input packet, a 1-bit ttl_copy, a 3-bit Num_label[2:0] indicating the number of MPLS labels, and a 1-bit pkt_err.

As shown in FIG. 5(b), the first delivery header (Delivery Header_1:DH_1) may include a 2-bit Ones[1:0], a 1-bit VLAN flag indicating whether or not a packet has a VLAN tag, and mapping a C-VID to a vid_or_mac_sa[11:0] if the packet has the VLAN tag, a 1-bit Valid, a 1-bit B-Flag indicating whether it is a B-Tag, a 1-bit I-Flag indicating whether or not it is an I-Tag, a 1-bit S-Flag indicating whether or not it is an S-Tag, a 1-bit C-Flag indicating whether or not it is an C-Tag, a 3-bit RSVD (Reserved) field, a 1-bit LLC-Flag indicating whether or not it is an LLC packet, an 1-bit SNAP-Flag indicating whether or not it is an SNAP packet, a vid_or_mac_sa[11:0] for mapping a 12-bit C-VID if an input packet has the VLAN Tag or mapping a 12-bit least significant bit (LSB) source address if the input packet does not have the VLAN Tag; a 1-bit RSVD, a 3-bit PCP[2:0] for mapping B-Tag PCP (Priority Code Point) bits if an input packet has the B-Tag and setting the input packet to zero if the input packet does not have the B-Tag, a 1-bit DEI for mapping a B-Tag drop eligible indicator (DEI) bit if an input packet has the B-Tag or setting the input packet as zero if it does not have the B-Tag, a 1-bit UCA for mapping a B-Tag use customer address (UCA) bit if an input packet has the B-Tag or setting the input packet to zero if the input packet does not have the B-Tag, and a 1-bit Except Flag.

As shown in FIG. 5(c), a second delivery header (Delivery Header_2: DH_2) may include a 20-bit Hash value obtained from the packet processor unit, a 1-bit RSVD field, a 1-bit Lpop indicating whether it is an actual MPLS packet, a 1-bit Stack indicating an MPSL stack bit, a 4-bit PORT[3:0], an IPCK[2:0] indicating a header check result of an IPv4 packet in which IPCK[2] is set if an IHL is not 5, IPCK[1] is set if a checksum result is not valid, and IPCK[0] is set if a total length is smaller than 20, a 1-bit flow_label_zero bit indicating setting of a flow_label_zero flag if a flow label field is zero and indicating that different IP/TCP/UDP fields are used in Hashing for a flow, and a 1-bit IPv6 Flag indicating whether it is an IPv4 packet or an IPv6 packet.

FIGS. 6A to 6E illustrate a packet conversion process in case of transmitting a packet from a PBBN to a PBN by using the L2/L3 packet processing apparatus according to an exemplary embodiment of the present invention. In the present exemplary embodiment, the input packet may be an IPv6/Ethernet/B-Tag packet.

FIG. 6A shows a configuration of an input packet immediately after being changed to a 64-bit format after it passes through a receive interface unit using the SPI interface.

FIG. 6B shows a configuration of an input packet resulting from the process in which the input packet passes through the header processing unit, the L2 header is analyzed, and the transitional header and the first delivery header (DH_1) are inserted. The configuration of this format may be maintained until reaching the packet filter unit.

FIG. 6C shows a configuration of an input packet resulting from the process in which the input packet passes through the packet processor unit, the transitional header and the first delivery header (DH_1) are updated, and the second delivery header (DH_2) is inserted.

FIG. 6D shows a configuration of an input packet resulting from the process in which when the input packet with the B-Tag is input from the PBBN, some bytes of the B-Tag and the I-Tag are removed, except for the I_SID for discovering a final output port, and the I_SID position is readjusted to transmit the input packet to the PBN.

FIG. 6E shows a configuration of an input packet resulting from the process in which the transitional header of the input packet is removed; unnecessary bytes of the packet after passing through the packet compressor unit are removed, and then packed.

The clock cycle at a right portion of each format shows 1 Tick in an actual internal processing.

FIGS. 7A to 7E illustrate a packet conversion process in the case of transmitting a packet from the PBN to the PBBN by using the L2/L3 packet processing apparatus according to an exemplary embodiment of the present invention. In the present exemplary embodiment, the input packet may be an IPv6/Ethernet/S-Tag packet.

FIG. 7A shows a configuration of an input packet immediately after being changed to a 64-bit format after it passes through a receive interface unit using the SPI interface.

FIG. 7B shows a configuration of an input packet resulting from the process in which the input packet passes through the header processing unit, the L2 header is analyzed, and the transitional header and the first delivery header (DH_1) are inserted. The configuration of this format may be maintained until reaching the packet filter unit.

FIG. 7C shows a configuration of an input packet resulting from the process in which the input packet passes through the packet processor unit, the transitional header and the first delivery header (DH_1) are updated, and the second delivery header (DH_2) is inserted. In addition, FIG. 7C also shows a configuration in which a packet is stored in a first skid buffer to secure a clock cycle in order to secure the regions of the B-Tag and I-Tag to be added for a transmission to the PBBN.

FIG. 7D shows a frame structure obtained by extending B-DA, B-SA, B-Tag, and I-Tag information obtained through the second LUT by the packet extension unit.

FIG. 7E shows a configuration of an input packet resulting from the process in which the transitional header of the input packet is removed; unnecessary bytes of the packet after passing through the packet compressor unit are removed, and then packed. The clock cycle at a right portion of each format shows 1 Tick in an actual internal processing process.

FIGS. 8A to 8E illustrate a packet conversion process in the case of transmitting a packet from an IPN to the PBBN by using the L2/L3 packet processing apparatus according to an exemplary embodiment of the present invention. In the present exemplary embodiment, the input packet may be an IPv6/Ethernet/C-Tag packet.

FIG. 8A shows a configuration of an input packet immediately after being changed to a 64-bit format after it passes through a receive interface unit using the SPI interface.

FIG. 8B shows a configuration of an input packet resulting from the process in which the input packet passes through the header processing unit, the L2 header is analyzed, and the transitional header and the first delivery header (DH_1) are inserted. The configuration of this format may be maintained until reaching the packet filter unit.

FIG. 8C shows a configuration of an input packet resulting from the process in which the input packet passes through the packet processor unit, the transitional header and the first delivery header (DH_1) are updated, and the second delivery header (DH_2) is inserted. In addition, FIG. 8C also shows a configuration in which the second delivery header (DH_2) is updated with a 20-bit Hash value obtained through a hash algorithm, extracted key values are sent to the NSE interface unit, and then, a packet is stored in the first skid buffer to secure the clock cycle in order to secure regions of a Route ID, a QoS address (Index), a DoS address (Index) for an IP flow acquired through the NSE interface unit, and the region of the B-Tag and the I-Tag for a transmission to the PBBN.

FIG. 8D shows a frame structure obtained by extending the Route ID, the QoS Index, and the DoS Index information for the IP flow acquired through the NSE interface unit, and the B-DA, B-SA, B-Tag, and I-Tag information obtained through the second LUT by the packet extension unit.

FIG. 8E shows a configuration of an input packet resulting from the process in which the transitional header of the input packet is removed; unnecessary bytes of the packet after passing through the packet compressor unit are removed, and then packed. The clock cycle at a right portion of each format shows 1 Tick in an actual internal processing.

Figure 9:
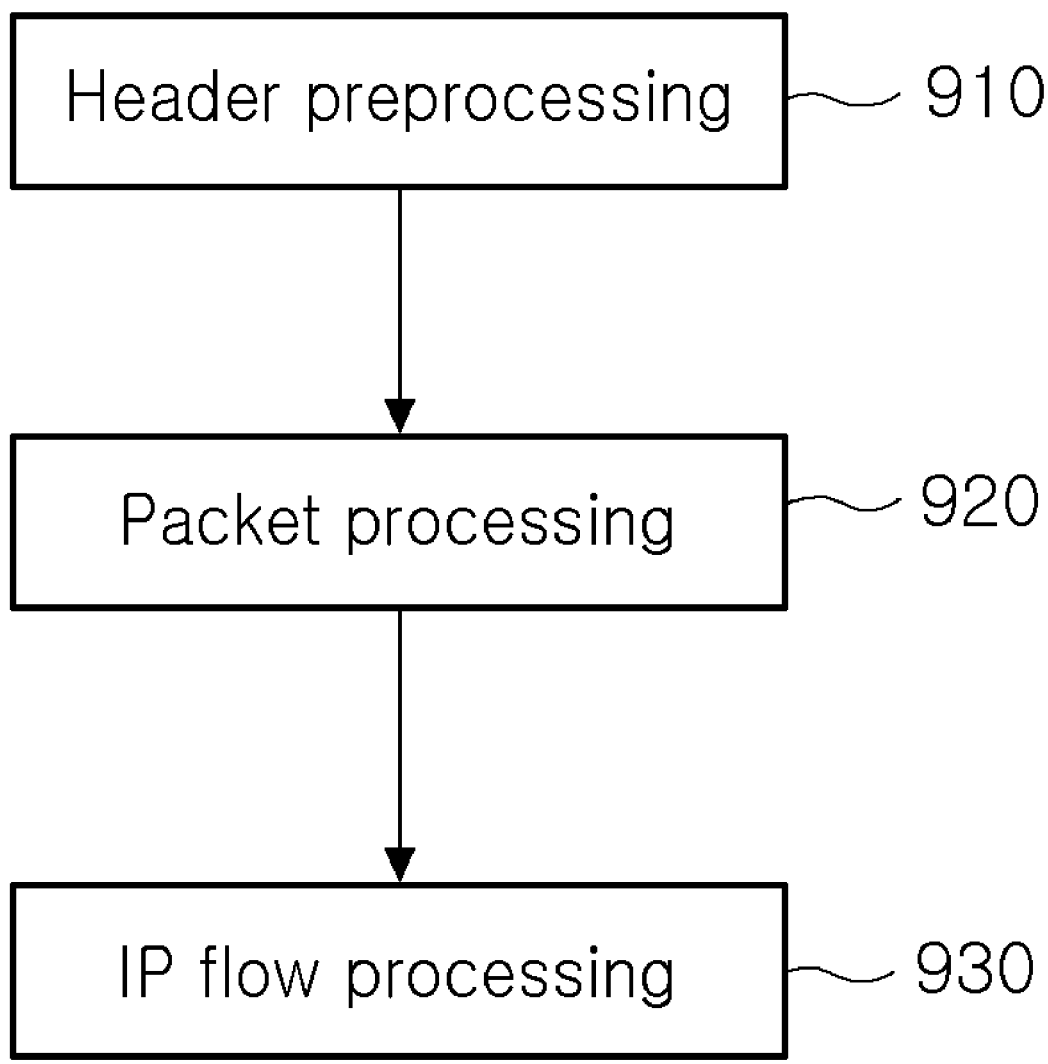
FIG. 9 is a flow chart illustrating the process of an L2/L3 packet processing method according to an exemplary embodiment of the present invention.

FIG. 9 is a flow chart illustrating the process of an L2/L3 packet processing method according to an exemplary embodiment of the present invention.

With reference to FIG. 9, an L2/L3 packet processing method 900 according to an exemplary embodiment of the present invention may include a header preprocessing step 910, a packet processing step 920, and an IP flow processing step 930.

The header preprocessing step 910 may be performed according to the processing order in the header preprocessing unit illustrated in FIG. 3.

Namely, the header preprocessing step may include an Ethertype detection step in which a first Ethertype is extracted from an input packet, if the Ethertype is 0x5DC or greater, the VID, B-Flag, I-Flag, S-Flag, and C-Flag are sequentially set in the first delivery header, and the second to fifth Ethertypes are sequentially detected, and a packet processing step in which the packet which has undergone the Ethertype detection step is processed into an IPv4, IPv6, MPLS or invalid packet.

Here, in the Ethertype detection step, if the Ethertype is the B-Tag, the VID and the second Ethertype may be extracted. If an Ethertype following the second Ethertype is the I-Tag, the I-SID may be extracted, the B-Flag and the I-Flag of the first delivery header may be set, and the third Ethertype may be extracted. If an Ethertype following the third Ethertype is the S-Tag, the S-Flag of the first delivery header may be set and the fourth Ethertype may be extracted. If an Ethertype following the fourth Ethertype is the C-Tag, the C-VID and the fifth Ethertype may be extracted and C-Flag may be set in the first delivery header.

In the packet processing step, if an Ethertype is 0x0800, the corresponding packet may be processed into an IPv4 packet. If an Ethertype is 0x86DD, the packet may be processed into an IPv6 packet. If an Ethertype is 0x8847, the packet may be processed into an MPLS packet. For other Ethertypes than the 0x0800, 0x86DD, and 0x8847, the Except Flag of the first delivery header is set to process the packet into an invalid packet.

The header preprocessing step 910 may further include an LLC header detection step in which if an Ethertype of the input packet is smaller than 0x5DC, the LLC-Flag is set to calculate a header length.

In the LLC header detection step, if the Ethertype is 0x8870, the DSAP (Destination Service Access Point), the SSAP(Source Service Access Point), and the Control of the Ethernet standard 802.2 may be extracted. If the DSAP and the SSAP are 0xFE, the input packet is processed into an OSI packet. If the DSAP and the SSAP are not 0xFE, it is checked whether or not the Control is 0x03. If the Control is not 0x03, the Except Flag of the first delivery header is set to process the input packet into an invalid packet. If the Control is 0x03 and the DSAP and the SSAP are 0xAA, the SNAP Flag of the first delivery header is set, and a next Ethertype is extracted and sent to the packet processing unit. If the DSAP and the SSAP are 0x06, the input packet is processed into an IPv4 packet. If the DSAP and the SSAP are not 0x06, the Except Flag of the first delivery header is set to process the input packet into an invalid packet.

In the packet processing step 920, an L3 header of the packet, which has undergone the header preprocessing step 910, is analyzed to generate an IP flow. In the present exemplary embodiment, in the packet processing step 920, the process performed by the packet processor unit described above with reference to FIG. 2 may be performed.

In the IP flow processing step 930, an output port may be determined according to information about the input packet, and the IP flow may be processed. In the present exemplary embodiment, the IP flow processing step 930 may be performed by the packet extension unit, the packet compressor unit, the look-up table, and the like, described above with reference to FIG. 2.

As set forth above, according to exemplary embodiments of the invention, the use efficiency of a network processor can be optimized so as to be economical, and the packet processing speed and performance can be improved in multimedia applications.

While the present invention has been shown and described in connection with the exemplary embodiments, it will be apparent to those skilled in the art that modifications and variations can be made without departing from the spirit and scope of the invention as defined by the appended claims.

What is claimed is:

1. An L2/L3 packet processing apparatus for processing packets by interworking with a provider backbone bridges network (PBBN), a provider bridges network (PBN), and an Internet protocol network (IPN), the apparatus comprising:
    a header preprocessing unit configured to analyze an L2 header of an input packet to create a transport header and update a flag of the transport header;
    a packet processor unit configured to analyze an L3 header of a packet which has passed through the header preprocessing unit to generate an IP flow;
    a packet extension unit connected with the packet processor unit and extending a frame in order to map a packet input from the PBN or the IPN to an L2 format of the PBBN;
    a packet compressor unit configured to realign packets which have passed through the packet extension unit, remove an unnecessary byte, and incorporate packets; and
    a look-up table connected to the packet processor unit and the packet extension unit and determining an output port according to information about the input packet,
    wherein the header preprocessing unit comprises:
        an Ethertype detection unit configured to extract a first Ethertype from the input packet, sequentially set a VID, a B-Flag, an I-Flag, an S-Flag, and a C-Flag in a first delivery header if the Ethertype is 0x5DC or higher, and sequentially detect second to fifth Ethertypes, and
        a packet processing unit configured to process the packet which has passed through the Ethertype detection unit into an IPv4, IPv6, MPLS and invalid packet.

2. The apparatus of claim 1, further comprising:
a packet filter unit configured to provide medium access control (MAC) filtering and L2-related filtering to the packet which has passed through the header processing unit.

3. The apparatus of claim 1, further comprising:
first and second skid buffers respectively connected to an input unit and an output unit of the packet extension unit to store packets for packet extension.

4. The apparatus of claim 1, wherein
if the Ethertype is a B-tag, the Ethertype detection unit extracts the VID and the second Ethertype,
if an Ethertype following the extracted second Ethertype is an I-Tag, the Ethertype detection unit extracts an I-SID, sets the B-Flag and the I-Flag of the first delivery header, and extracts the third Ethertype,
if an Ethertype following the extracted third Ethertype is an S-Tag, the Ethertype detection unit sets the S-Flag of the first delivery header and extracts the fourth Ethertype, and
if an Ethertype following the extracted fourth Ethertype is a C-Tag, the Ethertype detection unit extracts the fifth Ethertype and sets the C-Flag in the first delivery header.

5. The apparatus of claim 1, wherein
if the Ethertype is 0x0800, the packet processing unit processes the input packet into an IPv4 packet,
if the Ethertype is 0x86DD, the packet processing unit processes the input packet into an IPv6 packet,
if the Ethertype is 0x8847, the packet processing unit processes the input packet into an MPLS packet, and
in case of other Ethertypes than the Ethertypes of 0x0800, 0x86DD, and 0x8847, the packet processing unit sets an Except Flag of the first delivery header to process the input packet into an invalid packet.

6. The apparatus of claim 1, further comprising:
a logical link control (LLC) header detection unit configured to set an LLC-Flag to calculate a header length, if the Ethertype of the input packet is smaller than 0x5DC.

7. The apparatus of claim 6, wherein
if the Ethertype is 0x8870, the LLC header detection unit extracts a destination service access point (DSAP), a source service access point (SSAP), and a Control of the Ethernet standard 802.2,
if the DSAP and the SSAP are 0xFE, the LLC header detection unit processes the input packet into an open system interconnect (OSI) packet, if the DSAP and the SSAP are not 0xFE, the LLC header detection unit checks whether or not the Control is 0x03, and if the Control is not 0x03, the LLC header detection unit sets the Except Flag of the first delivery header to process the input packet into an invalid packet, if the Control is 0x03 and the DSAP and SSAP are 0xAA, the LLC header detection unit sets an SNAP Flag of the first delivery header, extracts a next Ethertype, and send the extracted Ethertype to the packet processing unit, and if the DSAP and the SSAP are 0x06, the LLC header detection unit processes the input packet into an IPv4 packet, and if the DSAP and the SSAP are not 0x06, the LLC header detection unit sets the Except Flag of the first delivery header to process the input packet into an invalid packet.

8. The apparatus of claim 1, wherein the packet processor unit comprises:
   an L2 processing engine configured to acquire an output port and a local ISID transmitted to the PBN with respect to an L2 frame input from the PBBN;
   an IPv4 processing engine configured to parse an IPv4 header, calculate a header checksum, and perform updating, if the input packet is an IPv4 packet;
   an MPLS processing engine configured to update a transitional header and a delivery header for an MPLS label, if the input packet is an MPLS packet; and
   an IPv6 processing engine configured to analyze a header of an IPv6 packet to acquire various look-up results and generate a 20-bit hash value, if the input packet is the IPv6 packet.

9. The apparatus of claim 1, wherein the look-up table comprises:
   a first look-up table connected to the packet processor unit and determining a port output to the PBN or the IPN according to information about a packet input from the PBBN; and
   a second look-up table connected to the packet extension unit and determining a port output to the PBBN according to information about a packet input from the PBN or the IPN.

10. An L2/L3 packet processing method for processing packets by interworking with a provider backbone bridges network (PBBN), a provider bridges network (PBN), and an Internet protocol network (IPN), the method comprising:
    a header preprocessing step of analyzing an L2 header of an input packet to generate a transport header, and updating a flag of the transport header;
    a packet processing step of analyzing an L3 header of a packet which has undergone the preprocessing step to generate an IP flow; and
    determining an output port according to information about the input packet, and processing the IP flow,
    wherein the header preprocessing step comprises:
        an Ethertype detection step of extracting a first Ethertype from the input packet, sequentially setting a VID, a B-Flag, an I-Flag, an S-Flag, and a C-flag in a first delivery header if the Ethertype is 0x5DC or higher, and sequentially detecting second to fifth Ethertypes, and
        a further packet processing step of processing the packet which has passed through the Ethertype detection unit into an IPv4, IPv6, MPLS and invalid packet.

11. The method of claim 10, wherein, in the Ethertype detection step,
    if the Ethertype is a B-tag, the VID and the second Ethertype are extracted,
    if an Ethertype following the extracted second Ethertype is an I-Tag, an I-SID is extracted, the B-Flag and the I-Flag of the first delivery header are set, and the third Ethertype is extracted,
    if an Ethertype following the extracted third Ethertype is an S-Tag, the S-Flag of the first delivery header is set and the fourth Ethertype is extracted, and
    if an Ethertype following the extracted fourth Ethertype is a C-Tag, C-VID and the fifth Ethertype is extracted and the C-Flag is set in the first delivery header.

12. The method of claim 10, wherein, in the further packet processing step,
    if the Ethertype is 0x0800, the input packet is processed into an IPv4 packet,
    if the Ethertype is 0x86DD, the input packet is processed into an IPv6 packet,
    if the Ethertype is 0x8847, the input packet is processed into an MPLS packet, and
    in case of other Ethertypes than the Ethertypes of 0x0800, 0x86DD, and 0x8847, an Except Flag of the first delivery header is set to process the input packet into an invalid packet.

13. The method of claim 10, further comprising:
    a header detection step in which if the Ethertype of the input packet is smaller than 0x5DC, an LLC-Flag is set to calculate a header length.

14. The method of claim 13, wherein in the LLC header detection step,
    if the Ethertype is 0x8870, a destination service access point (DSAP), a source service access point (SSAP), and a Control of the Ethernet standard 802.2 are extracted,
    if the DSAP and the SSAP are 0xFE, the input packet is processed into an open system interconnect (OSI) packet,
    if the DSAP and the SSAP are not 0xFE, it is checked whether or not the Control is 0x03, and if the Control is not 0x03, the Except Flag of the first delivery header is set to process the input packet into an invalid packet,
    if the Control is 0x03 and the DSAP and SSAP are 0xAA, an SNAP Flag of the first delivery header is set, a next Ethertype is extracted and sent to a packet processing unit, and if the DSAP and the SSAP are 0x06, the input packet is processed into an IPv4 packet, and if the DSAP and the SSAP are not 0x06, the Except Flag of the first delivery header is set to process the input packet into an invalid packet.

\* \* \* \* \*